United States Patent
Kim

(10) Patent No.: US 10,401,854 B2
(45) Date of Patent: Sep. 3, 2019

(54) VEHICLE AND A CONTROL METHOD THEREOF

(71) Applicant: HYUNDAI MOTOR COMPANY, Seoul (KR)

(72) Inventor: Hongbum Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 180 days.

(21) Appl. No.: 15/465,732

(22) Filed: Mar. 22, 2017

(65) Prior Publication Data

US 2018/0173224 A1 Jun. 21, 2018

(30) Foreign Application Priority Data

Dec. 15, 2016 (KR) .......................... 10-2016-0171305

(51) Int. Cl.
G05D 1/00 (2006.01)

(52) U.S. Cl.
CPC ... G05D 1/0061 (2013.01); *G05D 2201/0213* (2013.01)

(58) Field of Classification Search
CPC ....................................................... B60K 28/02
See application file for complete search history.

(56) References Cited

U.S. PATENT DOCUMENTS

| 9,182,761 B2* | 11/2015 | Fujita ..................... B60W 30/09 |
| 2016/0132054 A1* | 5/2016 | Eigel ..................... B60W 50/14 701/23 |
| 2016/0152232 A1* | 6/2016 | Takahashi ............ B62D 15/025 701/41 |
| 2018/0239971 A1* | 8/2018 | Kim ................... G06K 9/00818 |

FOREIGN PATENT DOCUMENTS

| JP | 2011240816 A | 12/2011 |
| JP | WO2013027803 A1 | 3/2015 |
| KR | 1020150140806 A | 12/2015 |

\* cited by examiner

*Primary Examiner* — Thomas G Black
*Assistant Examiner* — Ana D Thomas
(74) *Attorney, Agent, or Firm* — Lempia Summerfield Katz LLC

(57) ABSTRACT

A vehicle and a method of controlling a vehicle are capable of recognizing a driving situation upon autonomous driving, and of controlling components when a dangerous situation is sensed to thereby enable safe autonomous driving. The vehicle includes: a driver monitor configured to sense a driver's physical condition; an information collector configured to collect information about surroundings of the vehicle required for autonomous driving of the vehicle; and a controller to control an operation state of the vehicle based on a driving situation of the vehicle, if determining that the driver is out of control, based on the driver's physical condition, upon autonomous driving of the vehicle, and, if deriving the driving situation of the vehicle from the information about the surroundings of the vehicle, to determine that the driving situation of the vehicle is a situation of travelling on a slippery road.

17 Claims, 14 Drawing Sheets

VEHICLE AND A CONTROL METHOD THEREOF

CROSS-REFERENCE TO RELATED APPLICATION

This application claims priority to and the benefit of Korean Patent Application No. 10-2016-0171305, filed on Dec. 15, 2016 in the Korean Intellectual Property Office, the entire disclosure of which is incorporated herein by reference.

BACKGROUND

1. Field

Embodiments of the present disclosure relate to a vehicle and a control method thereof, and more particularly, to vehicle autonomous driving technology with improved safety.

2. Description of the Related Art

Autonomous driving technology is designed and implemented to enable a vehicle to autonomously travel by recognizing a road condition without a driver's control of putting on the brakes, rotating the steering wheel, or stepping on the accelerator pedal.

The autonomous driving technology is a core technology for implementing a smart car. In order to implement an autonomous driving car, the autonomous driving technology includes Highway Driving Assist (HDA, technology of automatically observing the proper distance between cars), Blind Spot Detection (BSD, technology of recognizing another vehicle during reversing or in a blind spot to sound a warning), Autonomous Emergency Brake (AEB, technology of operating the brakes when a driver fails to recognize another vehicle ahead), Lane Departure Warning System (LDWS), Lane Keeping Assist System (LKAS, technology of preventing departure from a lane without a turn signal), Advanced Smart Cruise Control (ASCC, technology of traveling at constant speed while observing a predetermined distance between cars), and Traffic Jam Assist (TJA).

Typical autonomous technology releases driving assist when unstable operation is generated in a vehicle, or performs, even when the vehicle is in an unstable state, the same control as when the vehicle is in a stable state. For example, the typical autonomous technology operates Electronic Stability Control (ESC), or stops operating when it rains heavily to give up control of the vehicle to the driver.

SUMMARY

Since vehicles should travel in a consistent manner even when a driver's intervention is impossible upon autonomous driving, technology for controlling a vehicle while minimizing risks is needed. Accordingly, studies into such technology are actively conducted. Therefore, it is an aspect of the present disclosure to provide a vehicle with the capability of recognizing a driving situation upon autonomous driving, and controlling components of the vehicle when a dangerous situation is sensed to thereby enable safe autonomous driving. It is also an aspect of the present disclosure to provide a method of controlling the vehicle.

Additional aspects of the disclosure will be set forth in part in the description which follows and, in part, will be understood from the description, or may be learned by practice of the disclosure.

In accordance with one aspect of the present disclosure, a vehicle includes: a driver monitor configured to sense a driver's physical condition; an information collector configured to collect information about surroundings of the vehicle required for autonomous driving of the vehicle; and a controller to control an operation state of the vehicle based on a driving situation of the vehicle, if determining that the driver is out of control, based on the driver's physical condition, upon autonomous driving of the vehicle, and, if deriving the driving situation of the vehicle from the information about the surroundings of the vehicle, to determine that the driving situation of the vehicle is a situation of travelling on a slippery road.

The controller may determine that the driving situation is a situation of travelling on a curved road. The controller may then calculate a curvature of the curved road based on the information about the surroundings of the vehicle, and may change a driving course of the vehicle based on the curvature of the curved road.

The curvature may be determined to be smaller than a predetermined value. The controller may then control the vehicle such that the driving course of the vehicle is within a lane or boundary of the curved road.

The controller may determine that the driving situation is a situation in which another vehicle approaches the vehicle. The controller may then control the vehicle such that the driving course of the vehicle is within a lane or boundary of the curved road.

The controller may change at least one of a maximum steering torque of the vehicle and a yaw rate of the vehicle, based on the curvature of the curved road.

The controller may determine that the vehicle travels on a straight road. The controller may then reduce a speed of the vehicle to a predetermined value.

The controller may derive data for acquiring the driving situation of the vehicle, based on the information about the surroundings of the vehicle. If the data is greater than or equal to a predetermined first level, the controller may determine that the driving situation of the vehicle is a situation of traveling on a slippery road.

The controller may determine that the driving situation of the vehicle is the situation of traveling on the slippery road, the controller reduces the predetermined first level to a predetermined second level.

The driver monitor may sense the driver's physical condition based on at least one of the driver's heart rate, the driver's eye condition, and a location of the driver's face.

The driver monitor may include at least one of a wheel speed sensor, an imaging camera, and a radar.

In accordance with one aspect of the present disclosure, a method of controlling a vehicle comprises: sensing a driver's physical condition; collecting information about surroundings of the vehicle required for autonomous driving of the vehicle; and controlling an operation state of the vehicle based on a driving situation of the vehicle, if it is determined that the driver is out of control, based on the driver's physical condition, upon autonomous driving of the vehicle, and, if the driving situation of the vehicle is derived based on the information about the surroundings of the vehicle, to determine that the driving situation of the vehicle is a situation of traveling on a slippery road.

The deriving of the driving situation of the vehicle may further include, if it is determined that the driving situation of the vehicle is a situation of traveling on a curved road, calculating a curvature of the curved road based on the information about the surroundings of the vehicle, and the controlling of the operation state of the vehicle comprises changing a driving course of the vehicle based on the curvature.

The controlling of the operation state of the vehicle may include, if the curvature is smaller than a predetermined value, controlling the vehicle such that the driving course of the vehicle is within a lane or boundary of the curved road.

The controlling of the operation state of the vehicle may include, if it is determined that the driving situation is a situation in which another vehicle approaches the vehicle, controlling the vehicle such that the driving course of the vehicle is within a lane or boundary of the curved road.

The controlling of the operation state of the vehicle may include changing at least one of a maximum steering torque of the vehicle and a yaw rate of the vehicle, based on the curvature.

The controlling of the operation state of the vehicle may include, if it is determined that the vehicle travels on a straight road, reducing a speed of the vehicle to a predetermined value.

The deriving of the driving situation of the vehicle may include: deriving data for acquiring a driving situation of the vehicle, based on the information about the surroundings of the vehicle, and if the data is greater than or equal to a predetermined first level, determining that the driving situation of the vehicle is a situation of travelling on a slippery road.

The method may further include, if it is determined that the driving situation of the vehicle is the situation of traveling on the slippery road, reducing the predetermined first level to a predetermined second level.

The sensing of the driver's physical condition may include sensing the driver's physical condition based on at least one of the driver's heart rate, the driver's eye condition, and a location of the driver's face.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
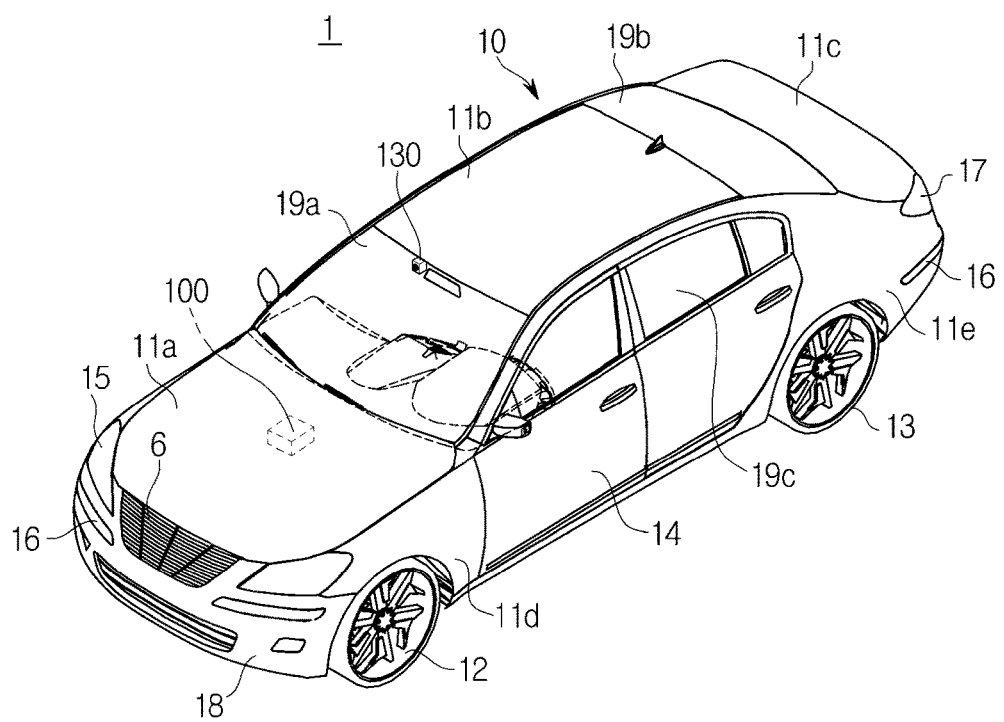
FIG. 1 is a perspective view schematically showing the outer appearance of a vehicle according to an embodiment of the present disclosure.

Like numbers refer to like elements throughout this specification and in the drawings. This specification does not describe all components of the embodiments, and general information in the technical field to which the present disclosure belongs or overlapping information between the embodiments is also not described. The terms "part", "module", "element", and "block", as used herein, may be implemented as software or hardware, and in the disclosed embodiments, a plurality of "part", "module", "element", and "block" may be implemented as a single component, or a single "part", "module", "element", and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that the terms "includes," "comprises," "including," and/or "comprising," when used in this specification, specify the presence of a stated component, but do not preclude the presence or addition of one or more other components.

It will be understood that, although the terms first, second, third, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations. Also, the operations can be executed in a different order from the stated order unless a specific order is definitely specified in the context.

Hereinafter, the operation principle and embodiments of the present disclosure are described with reference to the accompanying drawings.

FIG. 1 is a perspective view schematically showing the outer appearance of a vehicle according to an embodiment of the present disclosure.

Referring to FIG. 1, a vehicle 1 may include a vehicle body 10 forming the outer appearance of the vehicle 1, and a plurality of wheels 12 and 13 configured to move the vehicle 1.

The vehicle body 10 may include a hood 11a to protect various devices such as an engine required for driving the vehicle 1, a loop or roof panel 11b forming the internal space of the vehicle 1, a trunk lid 11c to provide storage space, and front fenders 11d and quarter panels 11e provided at both sides of the vehicle 1. Also, a plurality of doors 14 are hingedly-coupled with the vehicle body 10 and may be provided at both sides of the vehicle body 10.

A front window 19a to provide a view toward the front of the vehicle 1 may be provided between the hood 11a and the loop panel 11b, and a rear window 19b to provide a view to the back of the vehicle 1 may be provided between the loop panel 11b and the trunk lid 11c. Also, a plurality of side windows 19c to provide a view to the sides of the vehicle 1 may be provided at the upper parts of the doors 14.

A plurality of headlamps 15 to irradiate light in a heading or forward moving direction of the vehicle 1 may be provided at the front part of the vehicle 1.

Also, a plurality of turn signal lamps 16 to inform a movement direction of the vehicle 1 may be provided at the front and back parts of the vehicle 1.

The vehicle 1 may make the turn signal lamps 16 flicker or blink to inform a movement direction of the vehicle 1.

Also, a plurality of tail lamps 17 may be provided at the back part of the vehicle 10. The tail lamps 17 may inform a gear shifting state, a brake operation state, etc. of the vehicle 1.

In the inside or interior of the vehicle 1, at least one controller 100 may be provided. The controller 100 may perform electronic control related to operations of the vehicle 1. The controller 100 may be installed at an arbitrary location inside the vehicle 1 according to a designer's selection. For example, the controller 100 may be installed between an engine room and a dashboard, or in the inside of a center fascia. The controller 100 may include at least one processor to receive electrical signals, to process the received electrical signals, and then to output the processed signals. The at least one processor may be implemented with at least one semiconductor chip and the related components. The at least one semiconductor chip and the related components may be mounted on a Printed Circuit Board (PCB) that can be installed in the inside of the vehicle 1. Also, the vehicle 1 may include an imaging camera 130 to acquire images required for autonomous driving of the vehicle 1.

Figure 2:
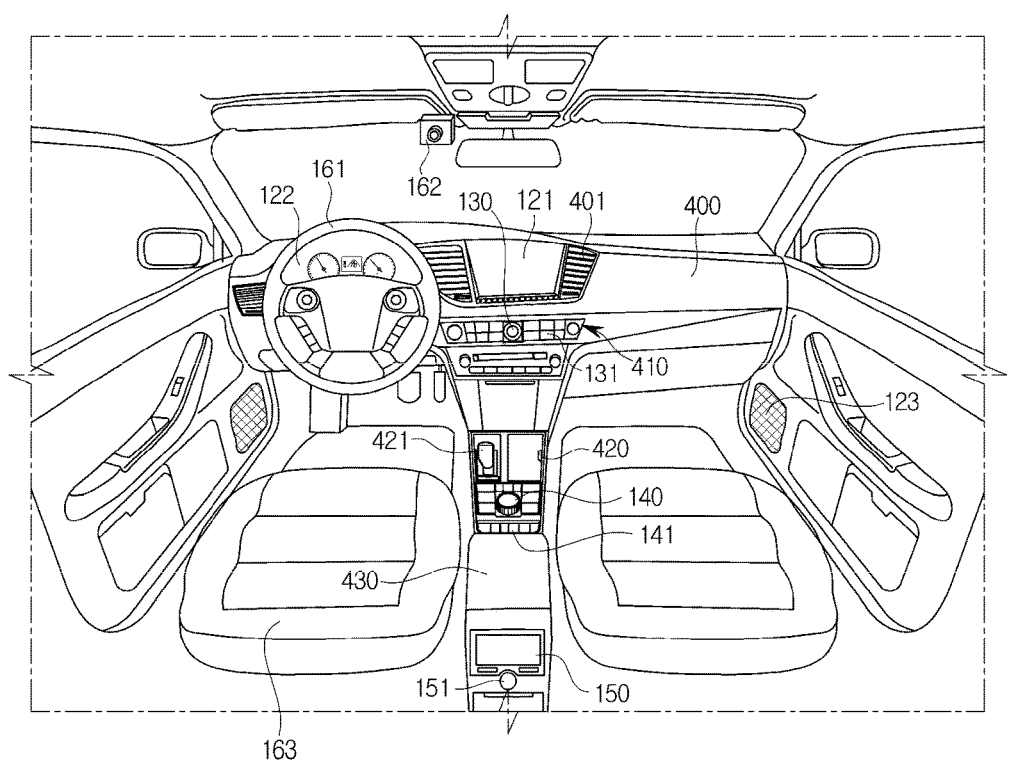
FIG. 2 shows the interior of a vehicle according to an embodiment of the present disclosure.

FIG. 2 shows the interior of a vehicle according to an embodiment of the present disclosure.

Referring to FIG. 2, in the inside of the vehicle 1, a dashboard 400, a center fascia 410 extending from the dashboard 400, a gear box 420 installed below the center fascia 410, and a console box 430 installed behind the gear box 420 may be provided.

The dashboard 400 may function to partition the inside space of the vehicle 1 from an engine room 5. A steering wheel 161, an instrument panel 122, an exhaust opening 401, etc. may be installed in the dashboard 400.

The steering wheel 161 may be disposed on the dashboard 400 around a driver's seat 163. The steering wheel 161 may include a rim that is gripped by a driver, and a spoke connecting the rim to a hub of a steering apparatus of the vehicle 1 located on a rotation shaft for steering. A driver may manipulate the rim to rotate the spoke to change the heading direction of the wheels 12 and 13, thereby adjusting a driving direction of the vehicle 1. Also, in the spoke, various input devices for controlling a radio apparatus, a communication apparatus for the vehicle, or the instrument panel 122, etc. may be provided. Also, an input device, such as a scroll wheel, a button, a knob, a touch screen, a touch pad, a lever, a trackball, an operation sensor, or a voice recognition sensor, etc., may be installed in the spoke.

The instrument panel 122 may display driving speed, Revolutions Per Minute (RPM), the amount of remaining fuel, a Distance To Empty (DTE), etc. of the vehicle 1. The instrument panel 122 may be installed, generally, in the dashboard 400 located in front of the steering wheel 161. According to embodiments, the instrument panel 122 may be disposed at various locations, such as another location on the dashboard 400 or the center fascia 410. The exhaust opening 401 may discharge air of a predetermined temperature to the inside of the vehicle 1 according to operation of an air conditioner to adjust the inside temperature of the vehicle 1. The exhaust opening 401 may be installed at various locations in the dashboard 400. For example, the exhaust opening 401 may be installed at both sides of a display 121, as shown in FIG. 2.

The display 121 may be installed on the upper frame of the dashboard 400. The display 121 may output various images, such as moving images or still images, for a user. Also, the display 121 may display, as images, information required for driving. For example, the display 121 may display a map showing the surroundings of the vehicle 1, or a moving course of the vehicle 1. The display 121 may be, for example, a navigation system. The display 121 may include a display panel and an external housing to fix the display panel. In the side or rear portion of the external housing, a fixing means (not shown) may be provided to fix the external housing at a predetermined location in the inside of the vehicle 1, for example, on the dashboard 400. If the display 121 is disposed on the upper portion of the dashboard 400, passengers as well as the driver can see a screen displayed on the display 121.

The center fascia 410 may be disposed between the dashboard 400 and the gear box 420. The center fascia 410 may include at least one of a scroll wheel, a button, a knob, a touch screen, a touch pad, a lever, and a trackball to enable a user, such as a driver or a passenger, to input various commands for manipulating various functions of the vehicle 1. Below the center fascia 410, the gear box 420 may be disposed in which a gear apparatus is installed. A gear rod or gear shift for shifting gears may protrude from the gear box 420. Also in the gear box 420, an input device to enable the driver to input various commands for manipulating various functions of the vehicle 1 may be provided.

A console box 430 may be provided behind the gear box 420. The console box 430 may provide predetermined space to store various things.

Also, in the inside of the vehicle 1, a speaker 123 may be provided to output sound. Accordingly, the vehicle 1 may output sound through the speaker 123 that may be required for performing an audio function, a video function, a navigation function, and other additional functions.

The vehicle 1 may include at least one speaker to output sound to the outside of the vehicle 1, in addition to the speaker 123 for outputting sound to the inside of the vehicle 1. The at least one speaker may be provided to output various sound for making pedestrians or drivers of other vehicles aware of or recognize the vehicle 1.

Figure 3:
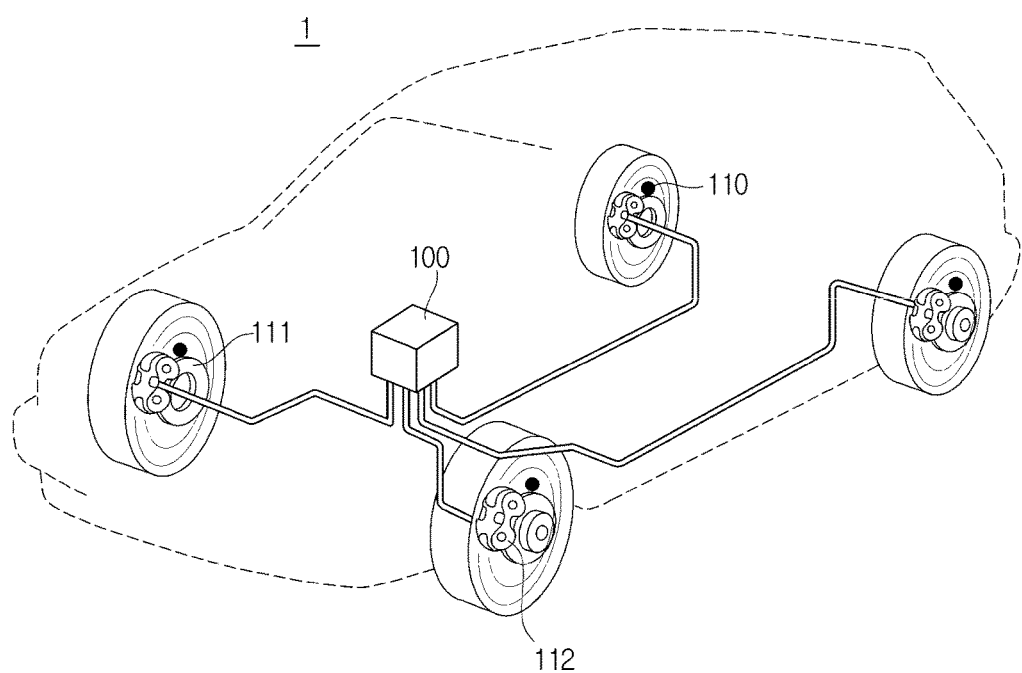
FIGS. 3 and 4 are views for describing an information collector of a vehicle according to an embodiment of the present disclosure.
Figure 4:
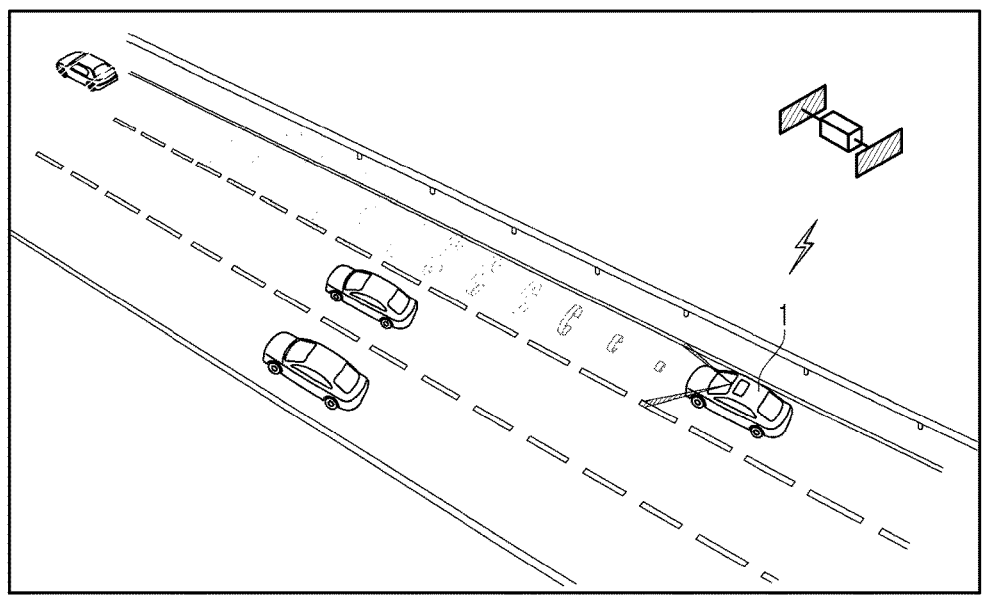

FIGS. 3 and 4 are views for describing an information collector of a vehicle according to an embodiment of the present disclosure.

FIG. 3 shows a wheel speed sensor of a vehicle according to an embodiment of the present disclosure.

Referring to FIG. 3, the vehicle 1 may include an anti-lock braking system (ABS) system. The ABS system may include the controller 100, which is an electronic control unit for a master cylinder and a booster of system such as a brake. The ABS system may also include a Hydraulic Control Unit (HCU), a plurality of sensors 110 for sensing the speed of the wheels 12 and 13, a Pedal Travel Switch (PTS) for sensing a braking state, a plurality of disc brakes 111, and a plurality of calipers 112.

The disc brakes 111 may acquire a braking force by compressing pads onto both sides of discs rotating together with the wheels 12 and 13 and then producing friction. A sealed drum brake has a disadvantage that the drum expands due to friction heat, if used frequently, causing it to malfunction. The disk brakes 111 can compensate for or address the disadvantage.

Main components of the ABS system may include discs rotating together with wheel hubs, pads pressing the discs to produce a friction force, wheel cylinders to which oil pressure is applied, and the calipers 112 to accommodate the wheel cylinders.

The calipers 112 may activate the brakes of the front wheels 12 by pressing the pads of the vehicle 1 onto the disc brakes 111, and the calipers 112 may operate by oil pressure. The calipers 112 may have a shape surrounding the brake discs of the front wheels 12. When the brakes are activated, oil pressure may be applied to the master cylinder, and brake oil inside the cylinder may generate oil pressure so that a force is generated in left and right directions in the inside of the cylinder. At this time, a force generated in the left direction may make the piston slide to press the inside pad onto the disc, and a force generated in the right direction may make the housing slide to the right. Thereby, the outside pad may be pressed onto the disc to produce a friction force simultaneously with the inside pad.

When the brakes are released, the piston may return to its original location due to the restoring force of the seal piston, and the inside pad may maintain a gap with the disc by rotation of the disc. Simultaneously, the pressing force applied to the outside pad may be released by the sliding of the housing so that the outside pad may maintain a gap with the disk, thereby removing residual torque.

A vehicle with an ABS system may include a wheel speed sensor for each wheel, and may analyze information sensed by the wheel speed sensor to pump any locked wheel so as to balance the four wheels. Accordingly, a skid phenomenon in which a vehicle skids can be prevented to maintain a control force. Also, a braking distance can be significantly shortened since no wheel is locked.

The wheel speed sensor 110 may be installed in each of the four front and rear wheels 12 and 13 to sense the speed of the wheels 12 and 13 based on changes in lines of magnetic force in the sensor 110 and a tone wheel, and to input the speed of the wheels 12 and 13 to a computer. The controller 100 may calculate a driving distance for each driving situation, based on the speed of the wheels 12 and 13 acquired by the wheel speed sensor 110, which is described further below. More specifically, the controller 100 may derive a driving state of the vehicle 1, based on a driving distance per unit time measured by the wheel speed sensor 110, which is also described further below. Also, the wheel speed sensor 110 may measure the speed of the wheels 12 and 13, and the controller 100 may calculate differences in speed between the four wheels 12 and 13 to determine whether a road is slippery.

FIG. 4 is a view for describing operations of a camera, a radar, and a communication module, among information collectors according to an embodiment of the present disclosure.

The radar 140 may sense an object ahead of the vehicle 1, and provide the result of the sensing to the controller 100. More specifically, the radar 140 may transmit electromagnetic waves forward, and receive an echo signal reflected from an object, thereby sensing the object.

The controller 100 may receive the echo signal from the radar 140, and recognize the location of the object based on the echo signal. The controller 100 may determine a lane along which the vehicle 1 is currently traveling, among a plurality of lanes of a driving road on which the vehicle 1 is currently traveling, based on the recognized location of the object. Also, the controller 100 may detect another vehicle approaching the vehicle 1, based on the recognized location of the object.

The camera 130 may photograph images about the surroundings of the vehicle 1, and transmit the photographed images to the controller 100. The controller 100 may derive a driving environment of the vehicle 1, such as the weather conditions, another vehicle around the vehicle 1, or a road condition, based on the images photographed by the camera 130. Meanwhile, the camera 130 installed in the vehicle 1 may be a Charge-Coupled Device (CCD) camera or a CMOS color image sensor. Herein, both the CCD and the CMOS mean a sensor of converting light received through a camera lens into electrical signals and storing the electrical signals. More specifically, the CCD camera may be an apparatus of converting images into electrical signals using a charge-coupled device. Also, a CMOS Image Sensor (CIS) means a low-consumption, low-power imaging apparatus having a CMOS structure, and functions as an electronic film of a digital device. Generally, the CCD is widely used in vehicles since it has higher sensitivity than the CIS. However, the camera 130 is not limited to the CCD. In other words, in the present disclosure, the type and location of the camera 130 are not limited.

Meanwhile, the information collector may include a communication module.

The communication module may include a Global Positioning System (GPS) antenna. The communication module may receive satellite signals including navigation messages propagated from satellites. The navigation messages may be used to find the current location of the vehicle 1, a total number of satellites from which the communication module can receive satellite signals, the number of satellites that can provide satellite signals in Line Of Sight (LOS), the driving speed of the vehicle 1, the multipath of satellite signals of a candidate region, etc. Information received by the communication module may be transmitted to the controller 100, and the controller 100 may derive a driving environment of the vehicle 1 based on the received information.

However, the information collector described above with reference to FIG. 4 is only an example, and a method of collecting information capable of deriving a driving environment of the vehicle 1 is not limited.

Figure 5:
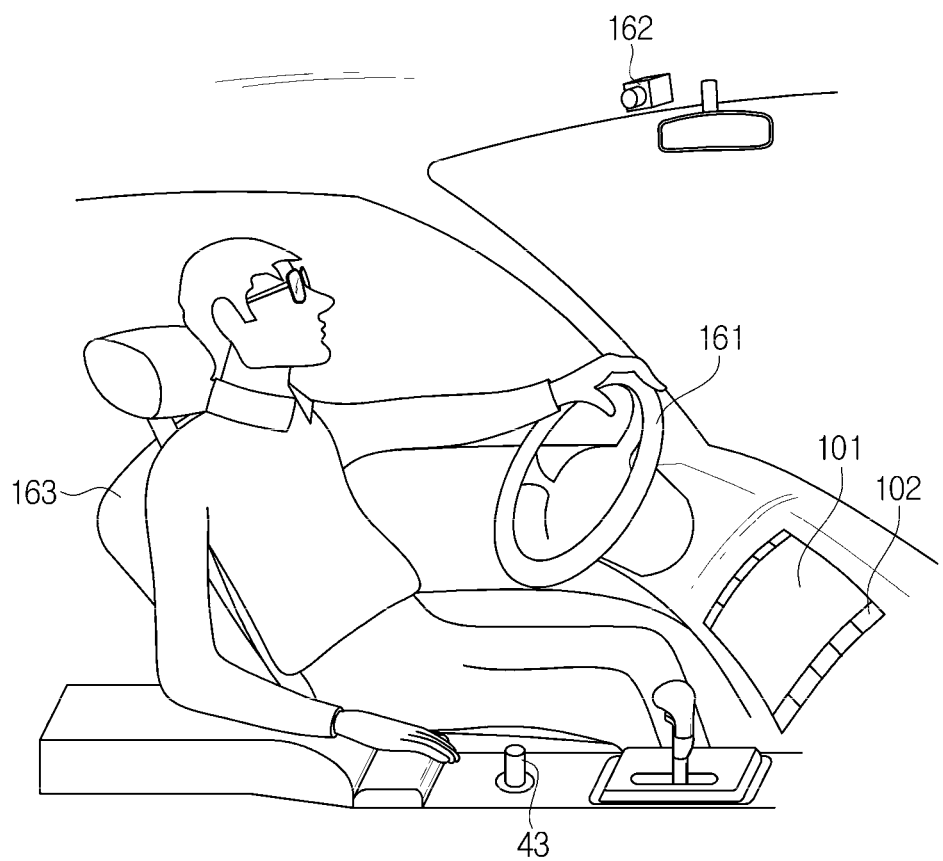
FIG. 5 shows a driver monitor of a vehicle according to an embodiment of the present disclosure.

FIG. 5 shows a driver monitor of a vehicle according to an embodiment of the present disclosure.

Referring to FIG. 5, a driver monitor may sense a driver's heart rate, the driver's eye condition, or the location of the driver's face.

The driver's heart rate may be measured by a plurality of electrodes installed in the steering wheel 161. If the driver's left and right hands contact the electrodes, a potential difference corresponding to the driver's heart potential may be generated between two electrodes. By detecting the potential difference generated between the two electrodes, the driver's heart rate can be measured. Alternatively, by putting a pulse wave sensor in the shape of a wristwatch, a ring, or the like on the driver, a heart rate signal may be detected.

Also, a device capable of measuring the driver's heart rate may be installed in the driver's seat 163, and the controller 100 may determine whether the driver is out of control, based on information about the driver's physical condition acquired from the driver's seat 163.

Also, the driver monitor may include an internal camera 162 to photograph the driver's face, and to measure the driver's condition based on the photographed image.

For example, if the driver's head is tilted at an angle that is greater than a predetermined angle, the controller 100 may determine that the driver is out of control, based on an image acquired by the internal camera 162. Also, the internal camera 162 may photograph the driver's eyes. If the internal camera 162 acquires an image in which the driver's eyes are closed, and transmits the image to the controller 100, the controller 100 may determine that the driver is out of control.

Meanwhile, the driver monitor may derive the driver's condition based on the amount of rotational or angular variation of the steering wheel 161. When the driver drives the vehicle 1 normally, the amount of angular variation of the steering wheel 161 may be not great. However, when the driver has any physical problem, the rotation angle of the steering wheel 161 may vary sharply or frequently. Accordingly, the driver monitor may sense such variation, and transmit the result of the sensing to the controller 100, so that the controller 100 can determine that the driver is out of control based on the result of the sensing.

Figure 6:
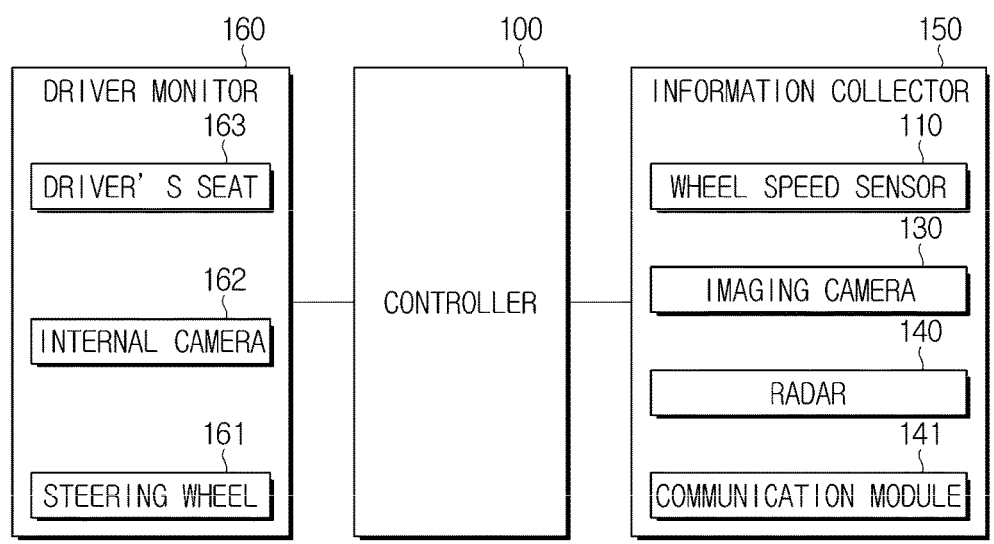
FIG. 6 is a control block diagram of a vehicle according to an embodiment of the present disclosure.

FIG. 6 is a control block diagram of a vehicle according to an embodiment of the present disclosure.

Referring to FIG. 6, the vehicle may include a driver monitor 160, an information collector 150, and the controller 100.

The driver monitor 160 may sense a driver's physical condition, and transmit information about the driver's physical condition to the controller 100, as described above. The driver's physical condition may be derived from the driver's heart rate, the driver's eye condition, or the location of the driver's face. The driver monitor 160 may include the driver's seat 163, the internal camera 162, and the steering wheel 161, as described above.

The information collector 150 may include the wheel speed sensor 110, the imaging camera 130, a radar 140, and a communication module 141, as described above. The wheel speed sensor 110 may be installed in the wheels 12 and 13 included in the vehicle 1 to detect the amount of rotation of each wheel, and to transmit information about the amount of rotation of each wheel to the controller 100.

The imaging camera 130 may acquire an image about the surroundings of the vehicle 1, and transmit the image to the controller 100, so that the controller 100 can determine whether another vehicle exists around the vehicle 1, weather information, etc., based on the image.

The radar 140 may transmit electromagnetic waves to the outside of the vehicle 1 to acquire information about the surrounding environment of the vehicle 1, and transmit the acquired information to the controller 100.

The communication module 141 may receive GPS information from satellites, and transmit the GPS information to the controller 100.

The controller 100 may receive information transmitted from the driver monitor 160 and the information collector 150. Then, the controller 100 may perform autonomous driving based on the information collected by the information collector 150. The autonomous driving is to enable a vehicle to recognize a road condition to autonomously travel without a driver's control of putting on the brakes, rotating the steering wheel, or stepping on the accelerator pedal. The controller 100 may determine whether the driver can drive the vehicle 1, based on the information acquired by the driver monitor 160. For example, if the driver's head is excessively tilted in an image acquired by the driver monitor 160, the controller 100 may determine that the driver is dozing, so as to determine that the driver is out of control. Also, if the driver's heart rate is out of a predetermined range, the controller 100 may determine that the driver's physical condition is abnormal, so as to determine that the driver is out of control.

Also, the controller 100 may derive a driving situation of the vehicle 1 based on the information collected by the information collector 150. For example, if a difference in speed between the wheels 12 and 13 measured by the wheel speed sensor 110 is greater than a predetermined value, the controller 100 may determine that the vehicle 1 travels on a slippery road. Also, if a camera installed in the information collector 150 acquires an image about the surroundings of the vehicle 1, the controller 100 may derive weather information based on the acquired image. If the controller 100 determines that the vehicle 1 travels in rainy weather, based on the weather information, the controller 100 may determine that the road is slippery.

Meanwhile, the information collector 150 may acquire location information of another vehicle around or near the vehicle 1, and the controller 100 may control the vehicle 1 to travel without colliding with the other vehicle, based on the acquired location information of the other vehicle.

Upon autonomous driving, if the controller 100 determines that the driver is out of control, based on the driver's physical condition, and determines that the driving situation of the vehicle 1 is a situation in which the road is slippery, based on information about the surroundings of the vehicle 1, the controller 100 may change the operation state of the vehicle 1 based on the driving situation of the vehicle 1. The operation state of the vehicle 1 may include the steering torque of the vehicle 1, the yaw rate of the vehicle 1, and the driving course of the vehicle 1.

If the vehicle 1 travels on a straight road, and the road is slippery, the controller 100 may control the brakes to decelerate the vehicle 1.

Also, if the vehicle 1 travels on a curved road, the controller 100 may calculate a curvature of the curved road based on an image acquired by the information collector 150. The controller 100 may change the maximum steering torque of the vehicle 1 and the yaw rate of the vehicle 1, based on the curvature of the curved road. This operation is described in more detail below.

Also, the controller 100 may change the driving course of the vehicle 1 based on the curvature of the curved road. In order to minimize steering torque that is applied to the vehicle 1, the controller 100 may control the vehicle 1 to travel in a gentle curve. Also, if there is no vehicle 1 approaching from the opposite lane, the controller 100 may control the vehicle 1 to cross the lane. However, in order to prevent a collision with another vehicle approaching the vehicle 1, the controller 100 may limit an area for changing the course.

The controller 100 may derive data for recognizing a driving situation of the vehicle 1, based on the information about the surroundings of the vehicle 1 collected by the information collector 150, and may digitize the data. If the digitized data is a predetermined first level, the controller 100 may determine that the road is slippery. When the vehicle 1 travels on a slippery road, it is necessary to more minutely analyze the amount of variation of information collected by the information collector 150. Accordingly, when the controller 100 determines that the vehicle 1 travels on a slippery road, the controller 100 may reduce the first level to a predetermined second level. More specifically, if the controller 100 has determined that the road is slippery when a difference in speed between the wheels 12 and 13 is a first level, the controller 100 may change the first level to a second level that is lower than the first level to thereby more sensitively control the operation of the vehicle 1.

Accordingly, the controller 100 can more sensitively respond to the amount of variation of information acquired by the information collector 150 although the amount of change of information is small, so that the controller 100 can provide autonomous driving that is more suitable for a driving situation than the typical method.

The controller 100 may include an Advanced Driver Assistance System (ADAS) module (not shown). The ADAS module may be controlled according to a decided driving lane. The ADAS means a system of providing the state of the vehicle 1, the driver's condition, and information about a surrounding environment, or actively controlling the vehicle 1 in order to reduce the driver's load and increase the driver's convenience. The ADAS module means a module for implementing the ADAS.

For example, it is assumed that the ADAS module is implemented as a Smart Cruise Control (SCC) system module. In this case, if the controller 100 determines that the vehicle 1 will enter a curved road according to a decided driving course, the controller 100 may control the SCC system module to reduce driving speed. Also, the controller 100 may determine whether the vehicle 1 departs from a course set for an intersection according to a decided driving course, and may then control the SCC system module to perform driving corresponding to the result of the determination.

The controller 100 may include memory to store programs for performing operations, which have been described above or are described below, and various data related to the programs, a processor to execute the programs stored in the memory, a HCU, and a Micro Controller Unit (MCU). Also, the controller 100 may be integrated into a System On Chip (SOC) installed in the vehicle 1, or may be operated by the processor. However, if the vehicle 1 includes a plurality of SOCs, the controller 100 may be integrated into the plurality of SOCs.

The controller 100 may be at least one type of storage medium among a flash memory type, a hard disk type, a multimedia card micro type, card type memory (for example, Secure Digital (SD) or eXtreme Digital (XD) memory), Random Access Memory (RAM), Static Random Access Memory (SRAM), Read-Only Memory (ROM), Electrically Erasable Programmable Read-Only Memory (EEPROM), magnetic memory, a magnetic disk, and an optical disk. However, the controller 100 may not be limited to the above-mentioned devices, and may be implemented as any other type of storage medium well-known to those of ordinary skill in the art.

Also, the controller 100 may communicate with the information collector 150 and the driver monitor 160. The controller 100 may use a Controller Area Network (CAN) of the vehicle 1. The CAN means a network system used for data transmission and control between the Electronic Control Units (ECUs) of a vehicle. More specifically, the CAN may transmit data through two strands of data wires twisted or separately shielded by sheaths. The CAN may operate according to a multi-master principle in which a plurality of ECUs function as a master in a master/slave system. Also, the controller 100 may receive a detection value transferred from the information collector 150 and the driver monitor 160 through an in-vehicle wired network, such as a Local Interconnect Network (LIN) or Most Oriented System Transport (MOST), or a wireless network such as Bluetooth.

At least one component may be added or removed in correspondence to the performance of the components of the vehicle 1 as shown in FIG. 6. Also, it will be understood by one of ordinary skill in the art that the relative locations of the components can change in correspondence to the performance or structure of the system.

Figure 7A:
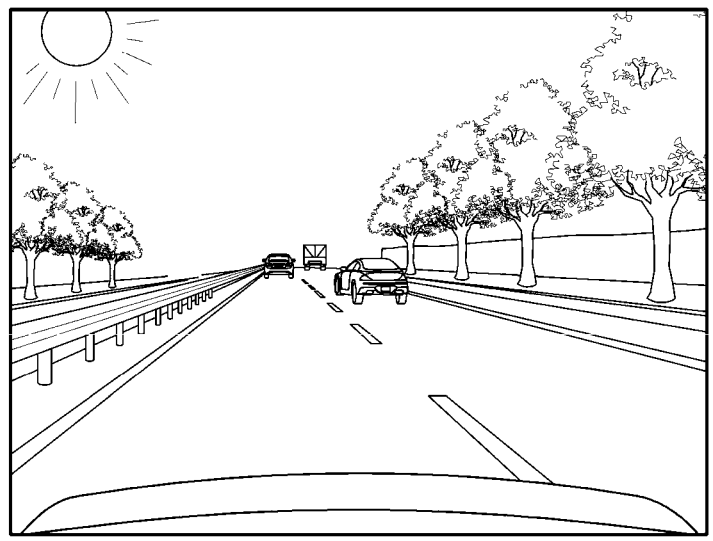
FIGS. 7A and 7B are views for describing straight autonomous driving when a vehicle according to an embodiment travels on a slippery road.
Figure 7B:
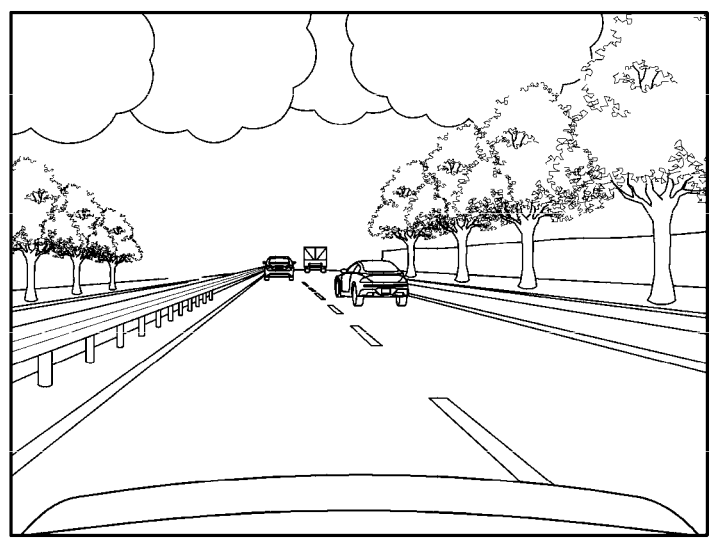

FIGS. 7A and 7B are views for describing straight autonomous driving when a vehicle according to an embodiment travels on a slippery road.

FIG. 7A shows a case in which the vehicle 1 travels on a non-slippery road.

Although the controller 100 determines that the driver is out of control, the controller 100 can provide normal autonomous driving when the vehicle 1 travels on a non-slippery road. Also, the controller 100 can provide safe autonomous driving based on a road course acquired by the information collector 150 and the locations of other vehicles around the vehicle 1.

FIG. 7B shows a case in which the vehicle 1 travels on a slippery road.

FIG. 7B shows a state in which the vehicle 1 travels when it rains. In this case, the controller 100 may determine that the driver is out of control, and determine that it is raining, based on information collected by the information collector 150. More specifically, the controller 100 may determine that it is raining, based on an image acquired by the camera 130. Also, the wheel speed sensor 110 may measure the speed of the wheels 12 and 13 of the vehicle 1, and if the controller 100 determines that a difference in speed between the wheels 12 and 13 is greater than a predetermined value, the controller 100 may determine that the road is slippery. In this case, the controller 100 may control the brakes installed in the vehicle 1 to reduce the speed and acceleration of the vehicle 1, thereby preventing accidents.

Figure 8A:
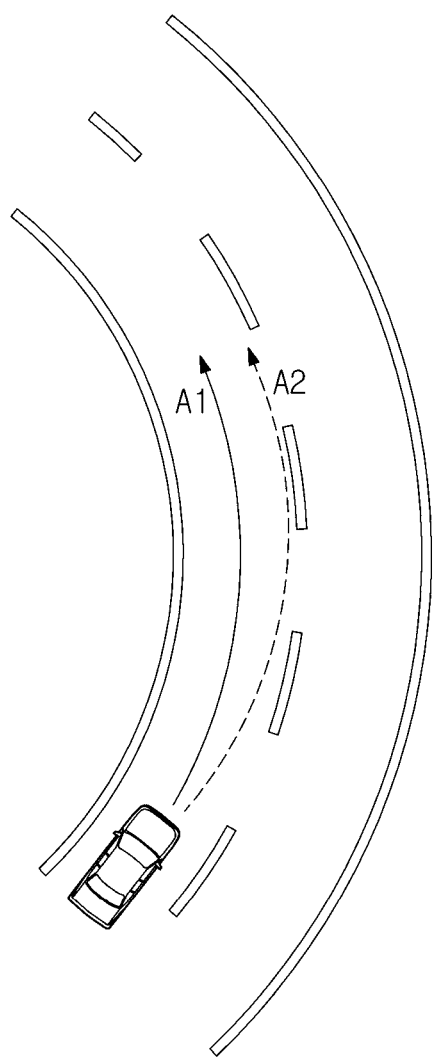
FIGS. 8A-8C is a diagram for explaining curve autonomous driving in a dangerous situation of a vehicle according to an embodiment.
Figure 8B:
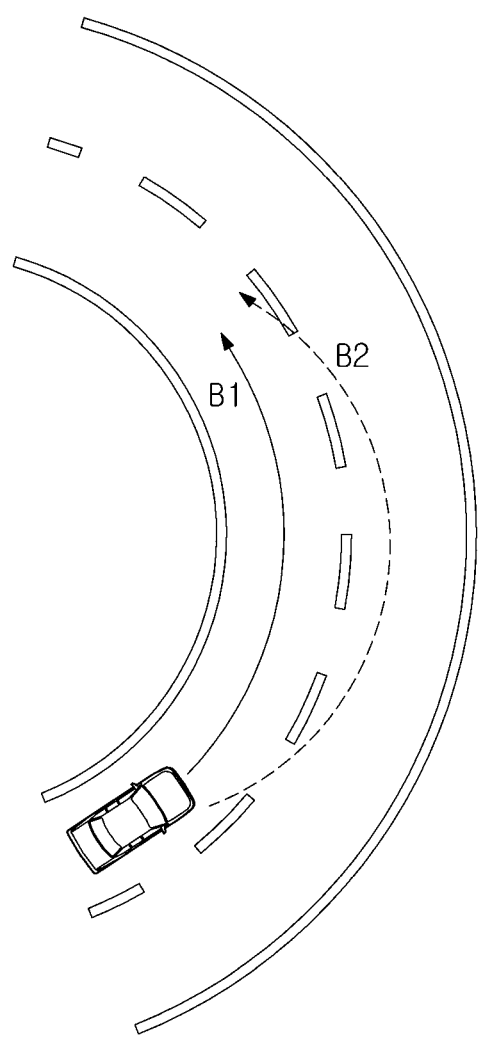
Figure 8C:
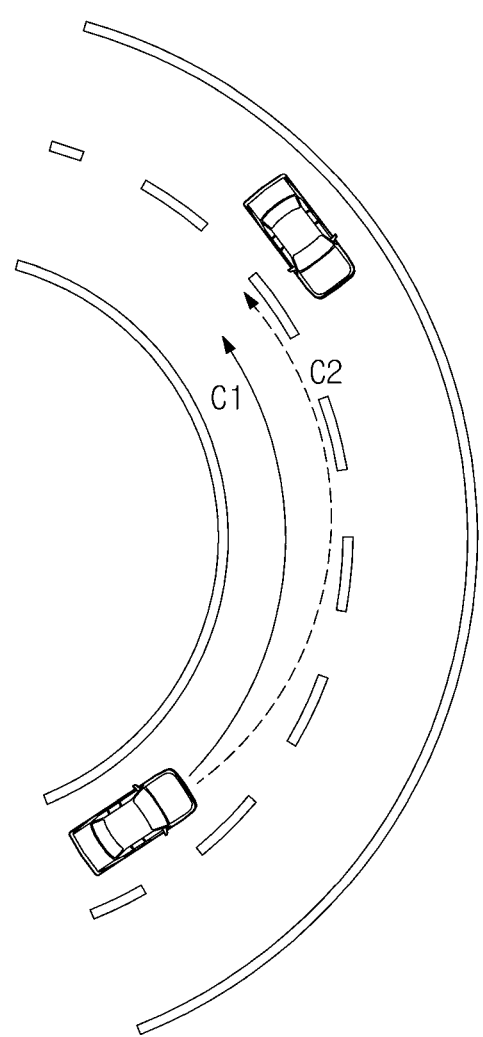

FIGS. 8A-8C are views for describing curved autonomous driving when a vehicle according to an embodiment encounters a dangerous situation.

FIG. 8A shows a case in which the vehicle 1 travels on a gently curved road.

As described above, the information collector 150 of the vehicle 1 may calculate a curvature of a road on which the vehicle 1 travels. If the curvature of the road is great, great steering torque may be applied to the vehicle 1 since the vehicle 1 needs to turn at a relatively great angle. Accordingly, if great steering torque is applied to the vehicle 1 when the vehicle 1 travels on a slippery road, there is high probability that the vehicle 1 slips, which increases the risk of traffic accidents. Accordingly, the controller 100 may change the driving course of the vehicle 1 from a first course A1 to a second course A2. Also, in this case, since the curvature of the road is gentle, the driving course of the vehicle 1 may not need to cross the lane or boundary of the road. Accordingly, the controller 100 may control the vehicle 1 such that the vehicle 1 does not cross the lane or boundary of the road for safe driving.

FIGS. 8B and 8C show cases in which the vehicle 1 travels on a road having a great curvature. If the vehicle 1 is controlled as shown in FIG. 8A when the vehicle 1 travels on a road having a great curvature, it may be difficult to significantly reduce steering torque. In other words, since a change in momentum of the vehicle 1 traveling on a road having a great curvature is greater than that on a road having a gentle curvature, great steering torque may be applied to the vehicle 1. Accordingly, the controller 100 may calculate a curvature of the road on which the vehicle 1 travels. If the curvature is greater than or equal to a predetermined value, the controller 100 may change the course of the vehicle 1 such that the vehicle 1 crosses the lane or boundary of the road on which the vehicle 1 travels. If the curvature of the road becomes greater, the controller 100 may control the vehicle 1 to travel further away from the road on which the vehicle 1 travels, in order to acquire a greater radius of rotation or turning radius than the course shown in FIG. 8B. That is, the controller 100 may change the driving course of the vehicle 1 from a first course B1 to a second course B2. Through the operation, the controller 100 may reduce steering torque that is applied to the vehicle 1.

Meanwhile, when the vehicle 1 travels along the course shown in FIGS. 8B and 8C, the controller 100 may determine whether another vehicle traveling on the opposite lane approaches the vehicle 1, based on information collected by the information collector 150. If the vehicle 1 deviates from the driving road in order to reduce the steering torque of the vehicle 1 when another vehicle traveling on the opposite lane approaches the vehicle 1, the vehicle 1 may collide with the other vehicle. Accordingly, the controller 100 may control the vehicle 1 such that the vehicle 1 does not deviate from the boundary of the driving road. In other words, the controller 100 may change the driving course of the vehicle 1 to a first course C1 from a second course C2.

Also, when the vehicle 1 travels on a curved road, the controller 100 may change the maximum steering torque and yaw rate of the vehicle 1, instead of changing the driving course of the vehicle 1, as shown in FIGS. 8A, 8B, and 8C.

The steering torque may be controlled by a steering system installed in the vehicle 1. The steering system may be an operating mechanism composed of a steering handle, a steering shaft, etc. to transfer a steering force to a gear apparatus. The steering system may be composed of a gear apparatus for increasing a rotation force while changing the direction of a steering force to transfer the rotation force to a driving link apparatus. The driving link apparatus may be to transfer the operation of the gear apparatus to the front wheels and to correctly support the positions of the left and right wheels. The steering system may be controlled by the controller 100. The controller 100 may control the steering system to adjust the maximum steering torque that is applied to the vehicle 1.

Meanwhile, the yaw rate may be controlled by a suspension installed in the vehicle 1. The suspension may be composed of a shock absorber, a spring, and a suspension arm. The suspension may have a function of absorbing shock generated against a road surface to prevent the shock from being directly transferred to the vehicle body or passengers, and may have a function of causing tires to stably grip a road. The controller 100 may control the components of the suspension to move the body of the vehicle 1, thereby adjusting the yaw rate of the vehicle 1.

The controller 100 may control overall operations of the steering system and the suspension to change the maximum steering torque and yaw rate of the vehicle 1 based on the curvature of the curved road on which the vehicle 1 travels. However, the above-described operations may be an embodiment in which the controller 100 changes the steering torque and yaw rate of the vehicle 1. A method of changing the steering torque and yaw rate of the vehicle 1 is not limited to just this disclosed embodiment.

Figure 9:
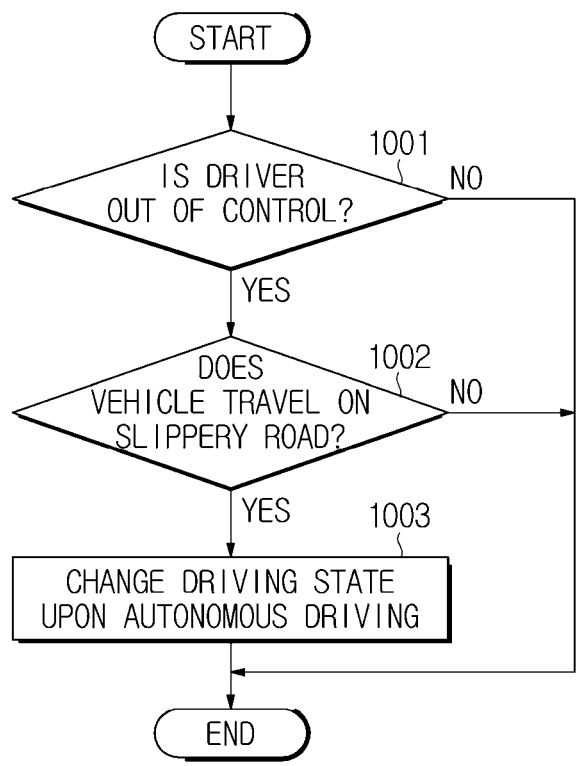
FIGS. 9-11 are flowcharts of a vehicle control method according to an embodiment of the present disclosure.
Figure 10:
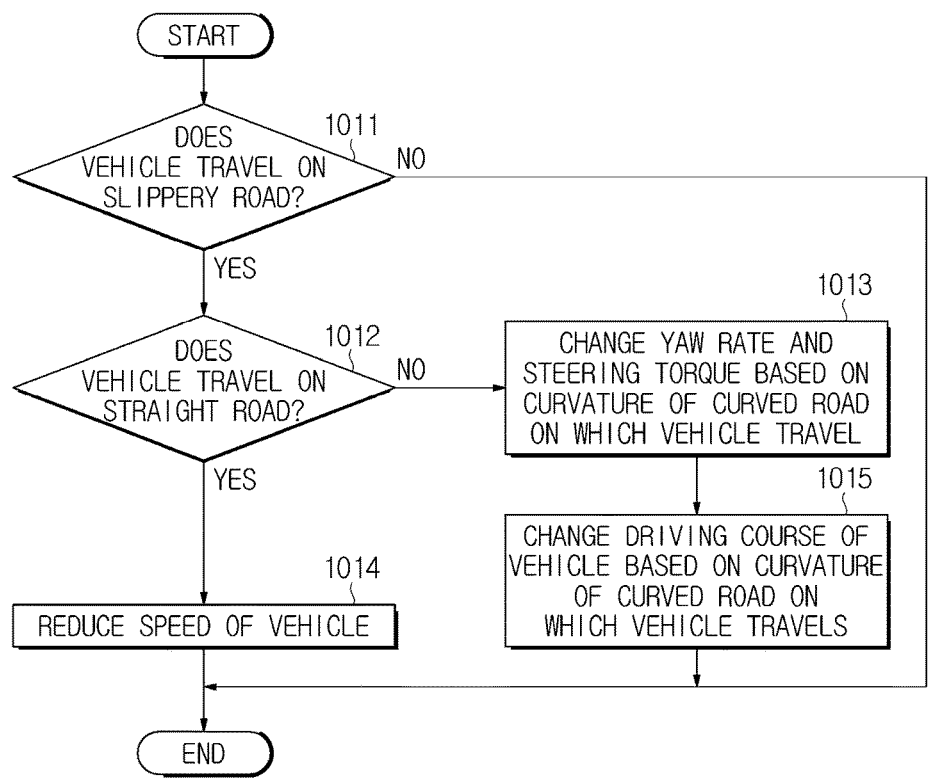
Figure 11:
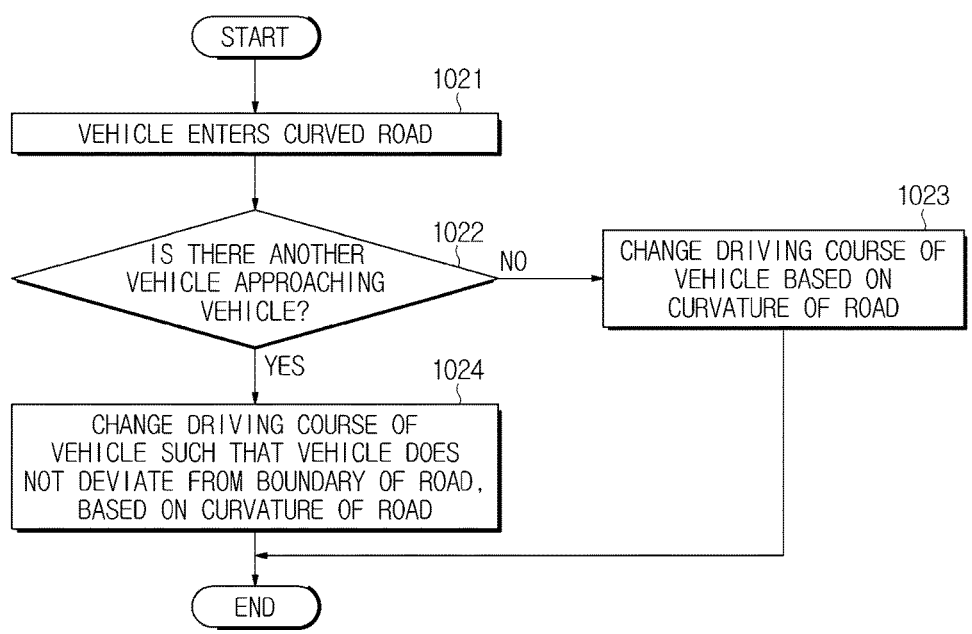

FIGS. 9-11 are flowcharts of a vehicle control method according to an embodiment of the present disclosure.

Referring to FIG. 9, the controller 100 may determine whether a driver is out of control, based on the driver's physical condition acquired by the driver monitor 160, in operation 1001. If the controller 100 determines that the driver is out of control, the controller 100 determines whether a road is slippery or whether it is raining. Or, in other words, whether the vehicle 1 travels on a slippery road, in operation 1002. If the controller 100 determines that the driver is out of control and that the vehicle 1 travels on a slippery road, the controller 100 may change the driving state of the vehicle 1 for safe driving, in operation 1003.

FIG. 10 is a flowchart illustrating an operation of changing the driving state of the vehicle in detail in the flowchart of FIG. 9.

Referring to FIG. 10, if the controller 100 determines in operation 1011 that the vehicle 1 travels on a slippery road, the controller 100 may determine whether the vehicle 1 travels on a straight road, in operation 1012. If the controller 100 determines that the vehicle 1 travels on a straight road, the controller 100 may reduce the speed of the vehicle 1 for safe driving, in operation 1014. If the controller 100 determines that the vehicle 1 travels on a curved road, the controller 100 may change a yaw rate and a steering torque, based on the curvature of the curved road on which the vehicle 1 travels, in operation 1013. and the controller 100 may then change the driving course of the vehicle 1 based on the curvature of the curved road, in operation 1015.

FIG. 11 is a flowchart illustrating an operation of changing the driving course of the vehicle based on the curvature of a curved road in detail in the flowchart of FIG. 10.

Referring to FIG. 11, when the vehicle 1 enters the curved road, in operation 1021, the controller 100 may determine whether another vehicle traveling on a lane or road that is different from the driving lane or road of the vehicle 1 approaches the vehicle 1, in operation 1022. If the controller 100 determines that there is no vehicle approaching the vehicle 1, the controller 100 may change the driving course of the vehicle 1 based on the curvature of the curved road, in operation 1023. If the controller 100 determines that there is another vehicle approaching the vehicle 1, the controller 100 may change the driving course of the vehicle 1 such that the vehicle 1 does not deviate from the boundary of the road or lane on which the vehicle 1 travels, in order to prevent the vehicle 1 from colliding with the other vehicle, in operation 1024.

Meanwhile, the embodiments as described above may be embodied in the form of a recording medium to store commands that can be executed by a computer. The commands may be stored in the form of program codes, and can create a program module, when executed by the processor, to perform the operations of the above-described embodiments. The recording medium may be embodied as a computer-readable recording medium.

The computer-readable recording medium may be or include any kind of recording device to store commands that can be interpreted by a computer. For example, the computer-readable recording medium may be ROM, RAM, a magnetic tape, a magnetic disk, flash memory, or an optical data storage device.

For the vehicle and the control method thereof according to the embodiments of the present disclosure, by recognizing the driving situation of the vehicle upon autonomous driving, and controlling the components of the vehicle when a dangerous situation is sensed, safe autonomous driving is possible.

Although various embodiments of the present disclosure have been shown and described herein, it should be appreciated by those having ordinary skill in the art that changes may be made in the disclosed embodiments without departing from the principles and spirit of the disclosure, the scope of which is defined in the claims and their equivalents.

What is claimed is:
1. A vehicle comprising:
 a driver monitor configured to sense a driver's physical condition;
 an information collector configured to collect information about surroundings of the vehicle, required for autonomous driving of the vehicle; and
 a controller to control an operation state of the vehicle based on a driving situation of the vehicle, upon autonomous driving of the vehicle when the driver is out of control, based on the driver's physical condition and when the driving situation is a situation of travelling on a slippery road,
 wherein the driving situation is determined based on the information about the surroundings of the vehicle, and wherein, when the controller determines that the driving situation is a situation of travelling on a curved road, the controller calculates a curvature of the curved road based on the information about the surroundings of the vehicle and changes a driving course of the vehicle based on the curvature of the curved road.

2. The vehicle according to claim 1, wherein, when the curvature is smaller than a predetermined value, the controller controls the vehicle such that the driving course of the vehicle is within a boundary of the curved road.

3. The vehicle according to claim 1, wherein, when the controller determines that the driving situation is a situation in which another vehicle approaches the vehicle, the controller controls the vehicle such that the driving course of the vehicle is within a boundary of the curved road.

4. The vehicle according to claim 1, wherein the controller changes at least one of a maximum steering torque of the vehicle and a yaw rate of the vehicle, based on the curvature.

5. The vehicle according to claim 1, wherein, when the controller determines that the vehicle travels on a straight road, the controller reduces a speed of the vehicle to a predetermined value.

6. The vehicle according to claim 1, wherein the controller derives data for acquiring the driving situation of the vehicle, based on the information about the surroundings of the vehicle, and
when the data is greater than or equal to a predetermined first level, the controller determines that the driving situation of the vehicle is a situation of traveling on a slippery road.

7. The vehicle according to claim 6, wherein, when the controller determines that the driving situation of the vehicle is the situation of traveling on the slippery road, the controller reduces the predetermined first level to a predetermined second level.

8. The vehicle according to claim 1, wherein the driver monitor senses the driver's physical condition based on at least one of the driver's heart rate, the driver's eye condition, and a location of the driver's face.

9. The vehicle according to claim 1, wherein the driver monitor includes at least one of a wheel speed sensor, an imaging camera, and a radar.

10. A method of controlling a vehicle, comprising:
sensing a driver's physical condition;
collecting information about surroundings of the vehicle required for autonomous driving of the vehicle; and
controlling an operation state of the vehicle based on a driving situation of the vehicle, upon autonomous driving of the vehicle when the driver is out of control based on the driver's physical condition and when the driving situation of the vehicle is a situation of traveling on a slippery road,
wherein the driving situation of the vehicle is derived based on the information about the surroundings of the vehicle,
wherein the deriving of the driving situation of the vehicle further comprises, when it is determined that the driving situation of the vehicle is a situation of traveling on a curved road, calculating a curvature of the curved road based on the information about the surroundings of the vehicle, and
wherein the controlling of the operation state of the vehicle comprises changing a driving course of the vehicle based on the curvature.

11. The method according to claim 10, wherein the controlling of the operation state of the vehicle comprises, when the curvature is smaller than a predetermined value, controlling the vehicle such that the driving course of the vehicle is within a boundary of the curved road.

12. The method according to claim 10, wherein the controlling of the operation state of the vehicle comprises, when it is determined that the driving situation is a situation in which another vehicle approaches the vehicle, controlling the vehicle such that the driving course of the vehicle is within a boundary of the curved road.

13. The method according to claim 10, wherein the controlling of the operation state of the vehicle comprises changing at least one of a maximum steering torque of the vehicle and a yaw rate of the vehicle, based on the curvature.

14. The method according to claim 10, wherein the controlling of the operation state of the vehicle comprises, when it is determined that the vehicle travels on a straight road, reducing a speed of the vehicle to a predetermined value.

15. The method according to claim 10, wherein the deriving of the driving situation of the vehicle comprises:
deriving data for acquiring a driving situation of the vehicle based on the information about the surroundings of the vehicle, and
when the data is greater than or equal to a predetermined first level, determining that the driving situation of the vehicle is a situation of travelling on a slippery road.

16. The method according to claim 15, further comprising, when it is determined that the driving situation of the vehicle is the situation of traveling on the slippery road, reducing the predetermined first level to a predetermined second level.

17. The method according to claim 10, wherein the sensing of the driver's physical condition comprises sensing the driver's physical condition based on at least one of the driver's heart rate, the driver's eye condition, and a location of the driver's face.

* * * * *